United States Patent
Collins

(10) Patent No.: US 10,458,390 B2
(45) Date of Patent: Oct. 29, 2019

(54) METHOD FOR CONTINUOUSLY MAKING A HELICAL TYPE CURVED SHAPED TURBINE BLADE

(71) Applicant: David A. Collins, Downers Grove, IL (US)

(72) Inventor: David A. Collins, Downers Grove, IL (US)

( * ) Notice: Subject to any disclaimer, the term of this patent is extended or adjusted under 35 U.S.C. 154(b) by 458 days.

(21) Appl. No.: 15/219,538

(22) Filed: Jul. 26, 2016

(65) Prior Publication Data
US 2017/0002793 A1    Jan. 5, 2017

Related U.S. Application Data

(62) Division of application No. 13/783,683, filed on Mar. 4, 2013, now abandoned.

(60) Provisional application No. 61/662,536, filed on Jun. 21, 2012.

(51) Int. Cl.
| | | |
|---|---|---|
| *F03D 3/06* | (2006.01) | |
| *B21D 53/78* | (2006.01) | |
| *F01D 5/14* | (2006.01) | |
| *B21D 25/02* | (2006.01) | |

(52) U.S. Cl.
CPC .............. *F03D 3/062* (2013.01); *B21D 25/02* (2013.01); *B21D 53/78* (2013.01); *F01D 5/14* (2013.01); *F03D 3/061* (2013.01); *F05B 2220/706* (2013.01); *F05B 2230/00* (2013.01); *F05B 2230/50* (2013.01); *F05B 2240/211* (2013.01); *F05B 2250/25* (2013.01); *Y02E 10/74* (2013.01); *Y02P 70/523* (2015.11); *Y10T 29/49336* (2015.01)

(58) Field of Classification Search
CPC ........ B21D 11/02; B21D 11/06; B21D 13/02; B21D 25/00–04; B21D 53/78; B21D 25/02; F03D 3/062; F03D 3/061; F01D 5/14; F05B 2250/25; F05B 2240/211; F05B 2220/706; F05B 2230/50; F05B 2230/00; Y02P 70/523; Y10T 29/49336–49343; Y02E 10/74; B21K 1/12; B23P 15/02; B23C 3/18
USPC .............................. 72/302, 307.19, 371, 385
See application file for complete search history.

(56) References Cited

U.S. PATENT DOCUMENTS

| | | | |
|---|---|---|---|
| 3,045,327 A | | 7/1962 | Clarke |
| 3,058,511 A | * | 10/1962 | Phillips .................. B21D 11/02 72/299 |
| 4,233,833 A | * | 11/1980 | Balinski ............... B21D 13/045 72/180 |
| 4,255,085 A | | 3/1981 | Evans |
| 4,886,421 A | | 12/1989 | Danson |
| 6,428,275 B1 | * | 8/2002 | Jaakkola ................. F03D 3/005 416/176 |
| 6,772,617 B1 | * | 8/2004 | Allen ....................... B21D 1/00 72/302 |
| 7,287,954 B2 | | 10/2007 | Kinkaid |
| 7,364,406 B2 | | 4/2008 | Kinkaid |

(Continued)

FOREIGN PATENT DOCUMENTS

GB    2464315    4/2010

*Primary Examiner* — Sarang Afzali
(74) *Attorney, Agent, or Firm* — James N. Videbeck

(57) ABSTRACT

A sheet metal blank is formed into a helical turbine blade by stretching an outer portion of the blank by creating indents and detents thereon. Then the stretched side is flattened and the stretched structure is formed into a helical shape.

6 Claims, 6 Drawing Sheets

(56) References Cited

U.S. PATENT DOCUMENTS

| | | |
|---|---|---|
| 7,494,315 B2 | 2/2009 | Hart |
| 7,766,600 B1 | 8/2010 | Vanderhye |
| 8,046,098 B2 * | 10/2011 | Paik .................. B21D 13/02 700/145 |
| 8,226,369 B2 | 7/2012 | Clark |
| 2003/0223857 A1 | 12/2003 | Milan |
| 2008/0106102 A1 | 5/2008 | Liao |
| 2008/0191487 A1 | 8/2008 | Morgan |
| 2008/0273977 A1 | 11/2008 | Beard |
| 2011/0025071 A1 | 2/2011 | Cortesi |
| 2011/0164977 A1 | 7/2011 | Vallejo |

* cited by examiner

METHOD FOR CONTINUOUSLY MAKING A HELICAL TYPE CURVED SHAPED TURBINE BLADE

This application is a divisional of non-provisional U.S. patent application Ser. No. 13/783,683, filed Mar. 4, 2013, entitled "HELIX TYPE VERTICAL AXIS TURBINE BLADES AND METHOD FOR CONTINUOUSLY MAKING SAME," now abandoned, and claims priority to provisional application Ser. No. 61/662,536 filed Jun. 21, 2012 to the extent allowed by law.

BACKGROUND OF THE INVENTION

Vertical axis wind turbines can be divided into two general types, savonius turbines and darrieus turbines. Darrieus turbines tend to have a plurality of symmetrical air foils that have a zero rigging angle, that is, the angle that the air foils are set relative to the structure on which they are mounted. Savonius turbines, when looking down on the rotor from above, having an S-shape in cross section, if it was of the two-blade variety.

Savonius turbines are considered to be of the drag-type of device and are used whenever cost or reliability is more important than efficiency.

Having a helix shaped vertical axis wind turbine blade provides a surface that will "catch" the wind from differing directions. The placement of dual helix shaped blades 180 degrees apart or triple helical shaped blades 120 degrees apart or quadruple helical blades 90 degrees apart provide for a reliable turbine configuration that aids in providing turbine rotation for just about any direction of wind passing thereby.

Prior known vertical axis helically shaped blades have been built and constructed in a segmented faction because the outer curved edge area of a helically constructed turbine blade has a larger surface than the area thereof adjacent a vertical axis of each blade. As a result, the prior art discloses a plurality of segmented curved end blades that are stacked upon one another to provide an approximation of a helical shaped blade, as shown in U.S. Pat. No. 7,364,406.

When a larger helically configured sheet is utilized in a vertical axis wind turbine, such as shown in advertising for Alternative Power Turbines Gale R15 series, the outer edge of each turbine blade is not vertically oriented as it is not parallel to the vertical axis of the turbine blade because of the extra surface area needed toward the outer edge of each blade.

Another helical shaped vertical axis wind turbine is shown at U.S. Pat. No. 7,494,315 which by its nature is cut into a large single segment, specifically constructed for the height and width of the turbine blade.

A need has developed for helical shaped vertical axis turbine blades that are formed inexpensively from sheet material in a somewhat continuous manner so that helical blades of differing lengths or heights can be constructed as desired and approximately continuously formed to be cut at such desired lengths.

It is, therefore, an object of the invention, generally stated, to provide a new and improved vertical axis helical type curved shaped turbine blade and an improved method for continuous manufacturing the blades.

SUMMARY OF THE INVENTION

A helical type shape turbine blade for use in a turbine that generates electrical and mechanical energy. The blade comprises a vertical inner edge having a length v. Like sized top and bottom edges of the blade each have a straight edge extending outwardly from the inner edge in a substantially straight line for a predetermined length, and thereafter curved into a semicircular shape.

The amount of stretch needed to form the helix type curve varies depending on the distance from the axis of rotation. For any point along the cross section of the helix, from the inside edge of the blade to the outer edge of the blade, the stretch can be calculated by the known vertical length of the blade and the length of the swept line s created by the chosen point on the cross section when the turbine blade rotates around a center of rotation for the desired angle.

The blade is made by feeding a sheet metal blank over metal dies to stretch the metal between the inner and outer edge thereof. The sheet metal blank is then formed and finally cut at a predetermined length. The metal form tools continuously press and form helical type curve shaped metal blades.

BRIEF DESCRIPTION OF THE DRAWINGS

The features of the present invention which are believed to be novel are set forth with particularity in the appended claims. The invention may best be understood from the following detailed description of currently preferred embodiments thereof taken in conjunction with the accompanying drawings wherein like numerals refer to like parts, and in which:

DETAILED DESCRIPTION OF THE PREFERRED EMBODIMENT

The ability to continuously produce a helix type curve shaped vertical axis turbine blade depends in large part on the correct stretching of an original metal sheet blank. The stretch is to accommodate a twist in the helix across its surface. The inside edge may be adapted to be mounted on either vertical axis or a center of rotation of the blade assembly. The axis can be a spine, backbone, stave, or simply a center of rotation and is preferably a straight vertical line. Some mathematical approximations are necessary in order to determine the amount of stretch that should be imparted to any given portion of the metal sheet that is made into a half of a helical type curved turbine blade assembly.

Figure 1:
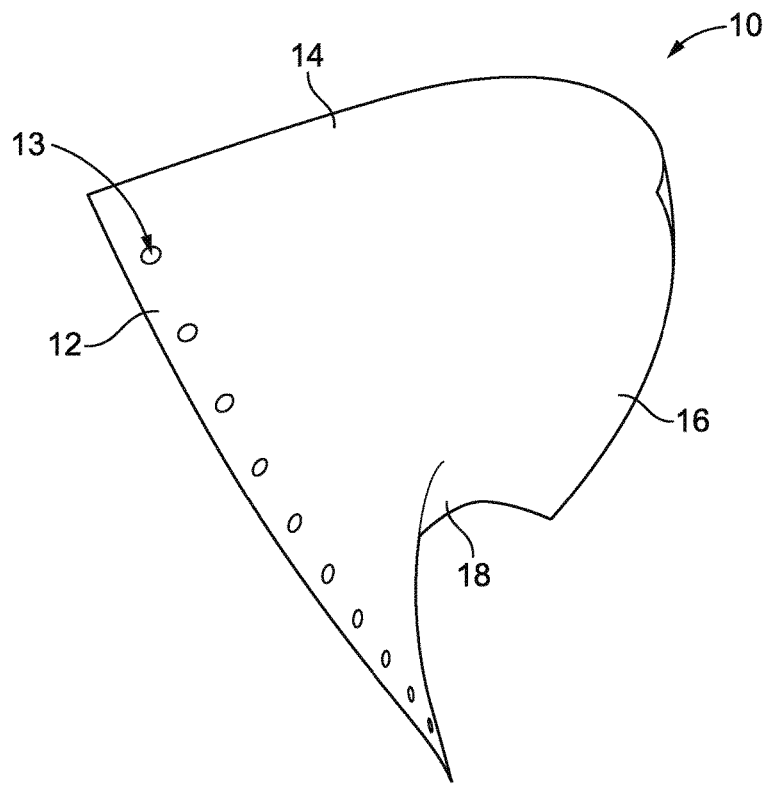
FIG. 1 is a top perspective view of a prototype segment of a vertical axis turbine blade constructed in accordance with the present invention.
Figure 2:
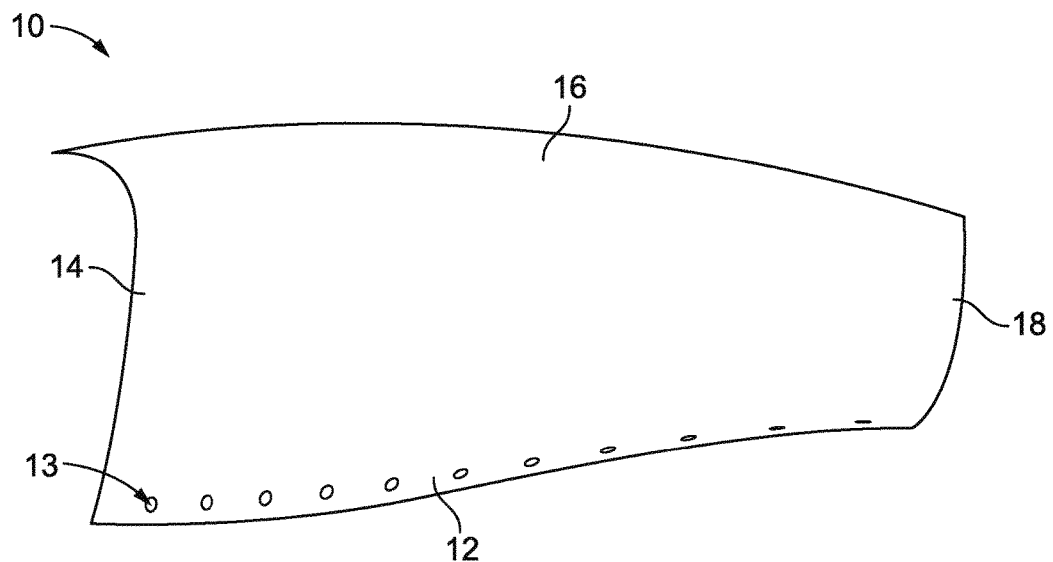
FIG. 2 is a horizontal elevational view of the blade shown in FIG. 1.

Referring to FIGS. 1 and 2, in FIG. 1, a sheet metal prototype turbine blade segment 10 is shown in an upper ¾ perspective view. FIG. 2 is a horizontal elevational view of the blade segment shown in FIG. 1. The turbine blade segment 10 has an inner edge 12, an upper edge 14, an outer edge 16, and a bottom edge 18. In this embodiment, the inner edge 12 has apertures or perforations 13 positioned in spatial relation to each other providing for mounting the inner portion of the turbine blade to a vertical axis or spine (not shown) or metal form indexer. In this example, the upper edge 14 of the helical turbine blade 10 extends outward from the top of the inner edge 12 in a substantially straight line for a predetermined length, and is thereafter curved into a semicircular shape at the end towards the outer edge 16. The bottom edge 18 has the same kind of substantially straight line and is thereafter curved into a semicircular shape at the end towards the outer edge 16 as is the upper edge 14. The outer edge 16 of the vertical blade segment 10 contacts the upper edge 14 and forms a helical shaped curvature between the top and bottom.

Figure 3:
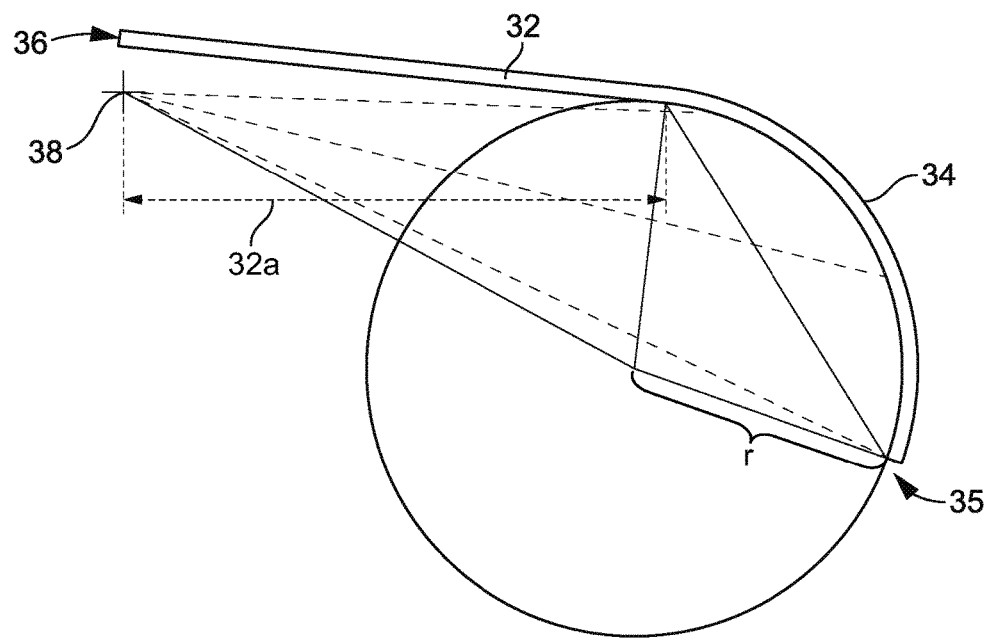
FIG. 3 is a schematic view of the top of a VAT blade as it would appear in finished form.

FIG. 3 is a schematic top down view of the upper edge of the turbine blade. The substantially straight portion 32 of the upper edge extends from the end 36 connecting with the inner edge of the turbine blade. The other end of the upper edge that goes to the outer edge of the turbine blade is curved into a semicircular shape portion 34 outwardly of the substantially straight portion 32.

The semicircular shape portion 34 has a known radius. In this embodiment, the semicircular portion 34, together with a substantially straight dimension 32a from the inner edge of portion 34 to the center of rotation 38, form the upper edge in a "J" shaped profile. In the illustrated embodiment in FIG. 3, the center of rotation 38 is slightly off the inner edge of the helical turbine blade. When a dual turbine blade is assembled (not shown), the center of rotation does not necessarily fall onto the body of the helical turbine blade as will be shown in more detail below.

One way to view the length of the outer edge of the helical turbine blade is to think of the diagonal edge of a cardboard tube, such as seen in the packaging for a frozen bakery product like breakfast rolls, etc., or in the spiral edge of a cardboard tubular shipping container that eventually folds back on itself and is glued together. If the axis on the cardboard paper of the tubular spiral is turned vertical, a horizontal line between that axis along the circumference of the tube to that outer glue edge becomes the second side of a triangle and the diagonal edge becomes the third side. If we open up that tubular member somewhat to a semicircular position, that triangular relationship still exists.

In a helical type curve shaped vertical axis turbine blade, there may be a portion of the blade immediately adjacent the vertical spine that is not curved, but is straight in nature. One must measure the swept line length of the outer edge when the turbine blade is rotating around the center of rotation of the blade.

We first determine the desired angle of rotation of the turbine blade based on appropriate engineering constraints such as number of blades, total turbine length, and the desired power output. For example, a three bladed turbine could have each blade manufactured to twist through 120° over a given length. Alternately, the blades could twist through a full 180° of rotation, or even more, over an increased length so as to increase the power output.

The distance from the turbine center of rotation 38 to any specific point on the part profile is the radius used in calculating the swept line for that point. In the illustrated embodiment shown in FIG. 3, the part profile in this case is the "J" shaped turbine blade upper edge. The turbine blade sweeps an arc using the radius r for an angle that equals the included angle of the arc segment 34 determined above. The length of this arc is the swept line s, and it can be calculated by:

$$s = 2\pi r \times \left(\frac{\text{included angle}}{360}\right)$$

Figure 4:
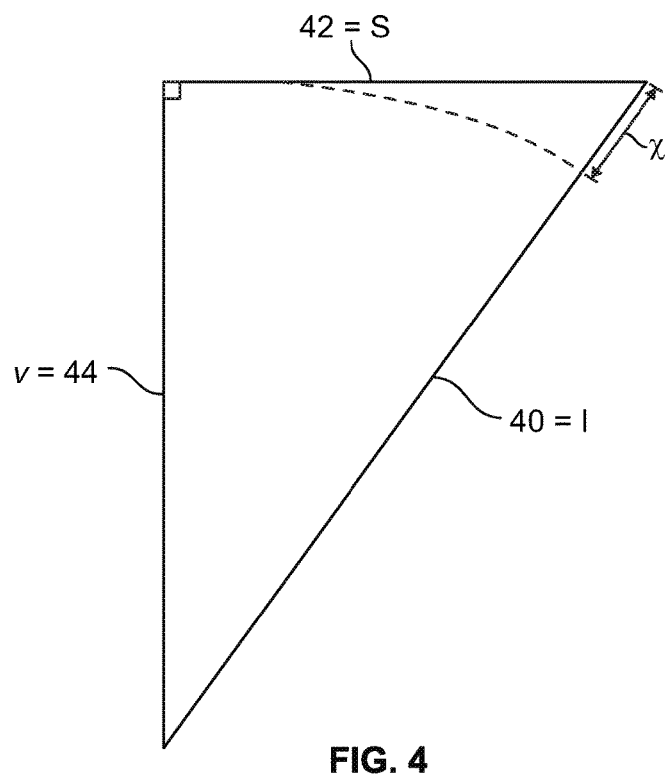
FIG. 4 is a diagrammatic sketch showing how to compute, by triangulation, the stretch needed to construct a helix type curve form on sheet metal.

Since we can measure the vertical distance v (44) from the beginning of the helix type curve of the blade, we can calculate the length of the hypotenuse 40 as shown in FIG. 4. The swept line s becomes the short side 42 of the right-angled triangle in FIG. 4. The vertical distance v becomes the long side of the right-angled sides of the triangle in FIG. 4. Therefore, the length l of the hypotenuse 40 is the square root of the vertical distance plus the horizontal distance squared.

$$l = \sqrt{h^2 + v^2}$$

Then by subtracting the length l of the hypotenuse 40 from the vertical length 44, we can calculate the stretch x needed to form the outer edge of the helix by:

$$x = l - v$$

For a point at the outer edge of the helix type shape, the stretch x is usually approximately 15% of the vertical distance v. Additionally, much of the inner part of the bent helix shape is correspondingly proportionally stretched, with the stretch diminishing toward the center of rotation.

Figure 5:
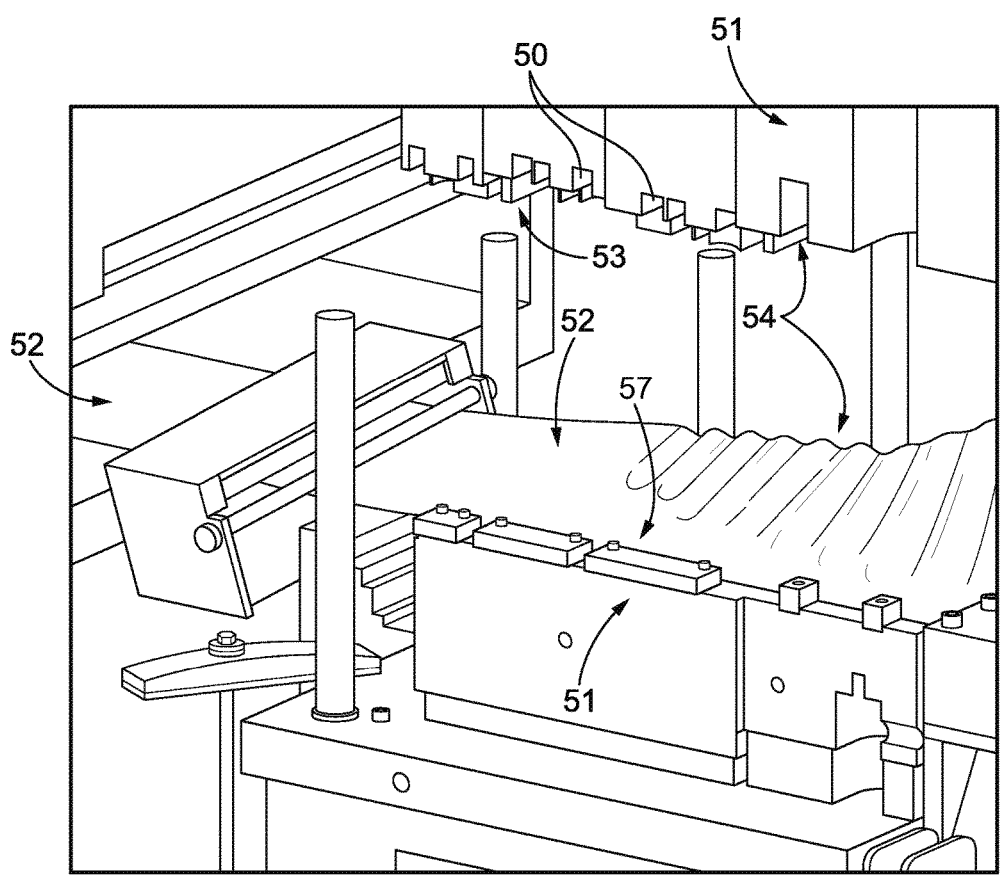
FIG. 5 is a horizontal perspective view of the beginning of the dies and press for creating the helical type curve blade of the invention.

Once one knows the amount of stretch needed per unit length for the outer edge of the helical type formation, one skilled in the art can produce detents 53 and indents 50 (flutes or inwardly closed louvers) in a metal forming press such as shown in FIG. 5 to provide the needed stretch (throughout) the metal sheet.

In a preferred embodiment, the vertical axis turbine blade having a helical type outline is formed in an automated press which is indexed to digitally feed the sheet metal blank 52 over the metal form 51 as shown in FIG. 5. The outer side 54 of the form 51 adjacent the outer edge of the helix of the sheet has the "V" shaped indents 50 and detents 53 formed in it as shown in FIG. 5. The inner edge of that form 51 has clamping members 57 positioned thereon to assure that the sheet 52 stays stationary when the press is in operation. The "U" or "V" shaped indents 50 and detents 53 are sized and shaped to follow the length of indexing of the sheet metal 52 as it passes over the form 51. When the sheet metal 52 is pressed by these "U" or "V" shaped indents 50 and detents 53, the indents 50 and detents 53 make the sheet metal 52 wavy and the surface of the sheet metal 52 is stretched.

Figure 6:
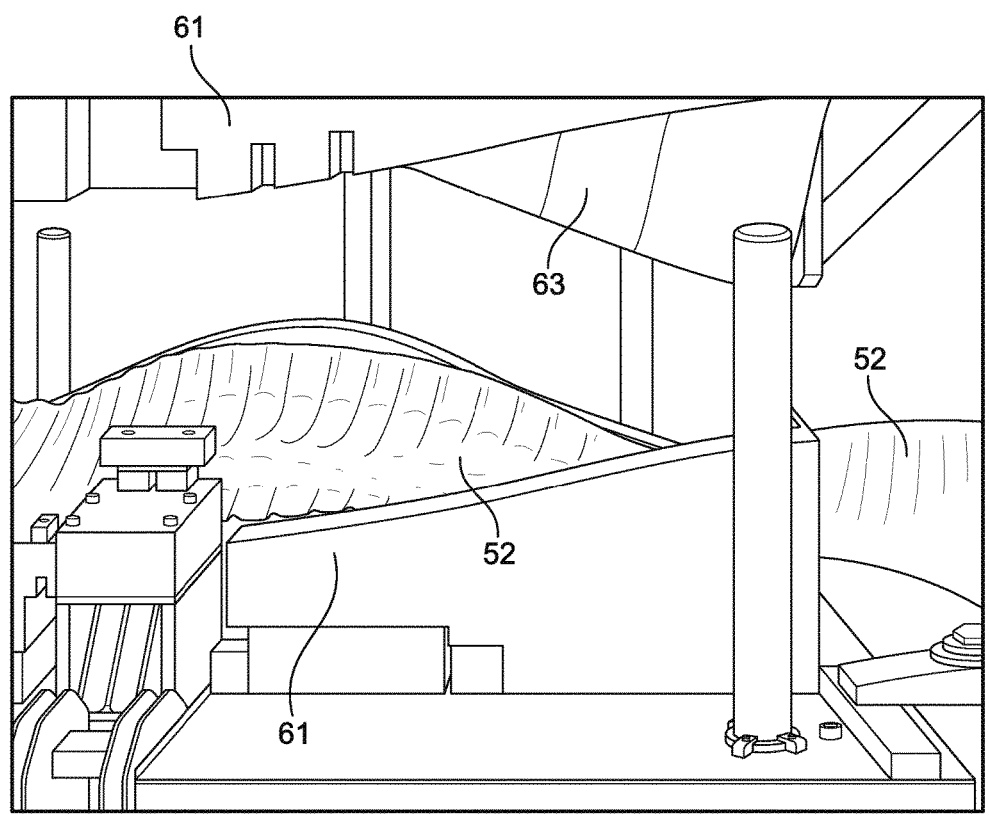
FIG. 6 is a horizontal perspective view of the middle and end of the dies and press for creating the helical type curve blade of the invention.
Figure 8:
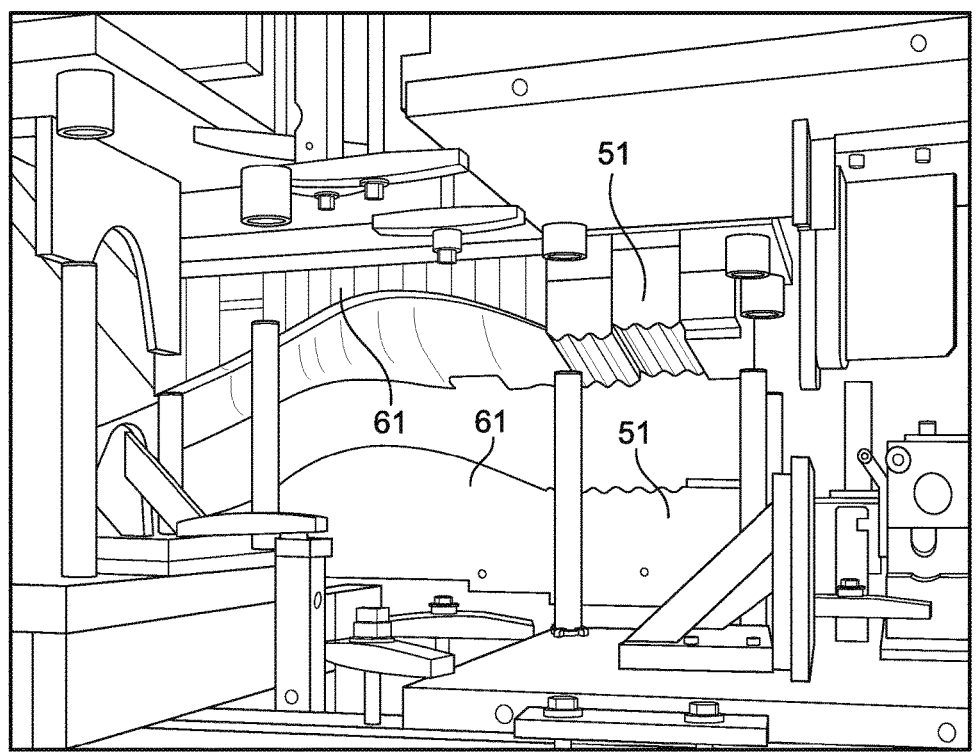
FIG. 8 is a horizontal perspective view of the opposing side of the dies and press.

In the preferred embodiment, once the necessary stretching adjacent the outer edge of the sheet metal 52 has been formed, then the entire width of the turbine blade sheet 52 is passed over a second portion of metal form 61 shown at FIGS. 6 and 8. FIG. 6 shows the processing of the sheet metal blank 52 immediately after the sheet metal 52 is stretched as illustrated in FIG. 5. FIG. 8 provides an illustration of the processes shown in FIGS. 5 and 6, from the opposing side of the dies and press. The sheet metal is first pressed by the first metal form 51, and by the second metal form 61 shortly thereafter.

FIG. 6 shows the sheet metal blank 52 being indexed in several movements, bent over the second metal form 61. The latter part of the second metal form 52 includes a fairly flat top portion 63 and a fairly flat bottom portion. The bottom portion is not shown in the figure because it is under the metal blank 52.

It should be noted that while in the preferred embodiment the wavy stretched portion of the sheet metal is formed prior to forming the flat sheet metal into the "J" shape, the wavy stretched portion could also be formed after forming that "J" shape.

Figure 7:
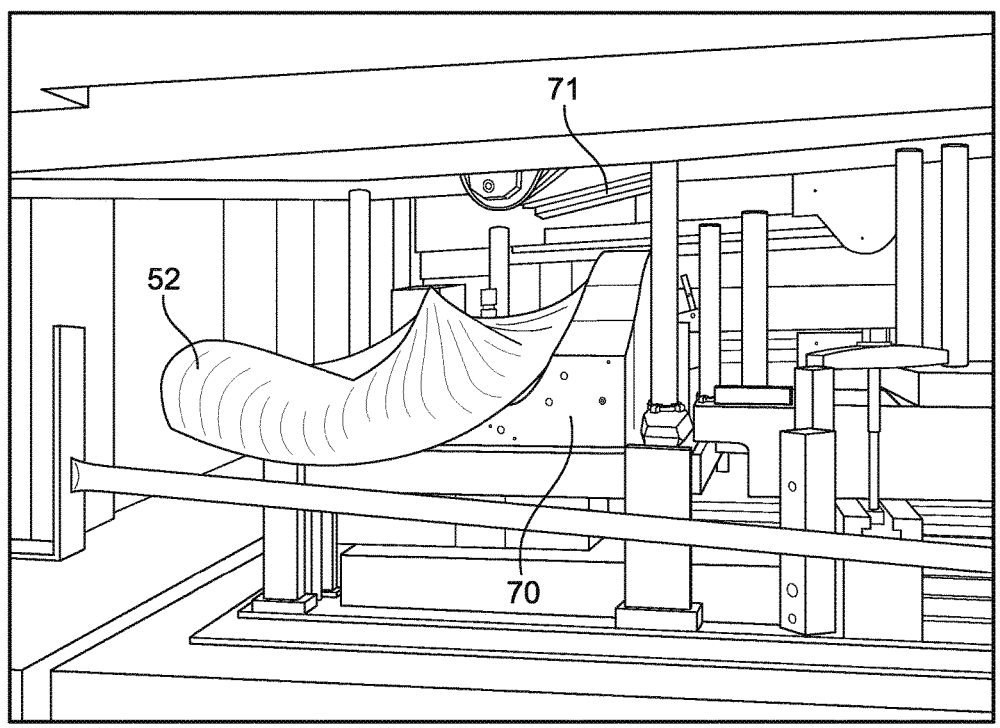
FIG. 7 is an end perspective view of the dies and press showing the formed turbine blade exiting the press.

FIG. 7 shows an end perspective view of the dies and press. The sheet metal 52 is moved across the end of the form portion of the press 70. As the indexing identifies that a predetermined length of sheet metal 52 has passed thereover, a shear operation is formed to cut the turbine blade to a predetermined length. It should be noted that, as the turbine blade continues to be formed, the guillotine shear 71 can be programmed to cut the sheet metal at any desired length to provide turbine blades of any desired length. The entire operation, while the sheet metal is digitally moved forward, can form a multiple of turbine blades in a fairly continuous manner.

It should be noted that in forming the turbine blades, the metal forming portion of the operation and the dies used to form same may result in a spiraling of the entire blade to some extent, including the inner vertical edge. However, the sheet metal is of such thickness that any curvature therein can be corrected when that edge is attached to a spine, vertical support member or complementary second blade, as shown in more detail below. The resulting vertical axis turbine blade has an approximate helical curved shape which has the ability to "catch the wind" coming from just about any of a number of directions to provide for rotation of the vertical axis thereof.

Additionally, it should be noted that the turbine blade thus formed can be combined with additional turbine blades to also form a double blade function, triple blade function or a quadruple blade function on a vertical axis turbine.

The invention is at a full remove from generating power, it aids in making helical style turbines, which are put on generators and then used to generate the power. The efficiency of the generator they are attached to can vary all over.

While one particular embodiment of a continuously formed vertical axis turbine blade of the present invention has been shown and described, it will be apparent to those skilled in the art that changes and modifications may be made without departing from the true spirit and scope of the present invention. It is the intent of the appended claims to cover all such changes and modifications as fall within the true spirit and scope of the invention.

I claim:

1. A method for continuously making a curved shaped turbine blade from a sheet metal blank having an inner vertical edge, an outer edge generally parallel to said inner edge, and a top edge perpendicular to and joining said inner and outer edges, said inner vertical edge including a plurality of apertures in spatial relation positioned adjacent thereto, the method comprising the steps of:

calculating an amount of stretch needed per unit length thereof for forming a curved outer edge on said sheet metal blank;

mounting said sheet metal blank on a metal forming press with said apertures in indexing position thereon;

digitally feeding the sheet metal blank over a first metal form to produce detents and indents starting a predetermined perpendicular distance from said inner edge on said sheet metal blank in said first metal form for providing the needed stretch from said starting distance to said outer edge of said sheet metal blank;

bending said stretched sheet metal blank over a second metal form to flatten the stretched indents and detents; and cutting said stretched sheet metal blank to a predetermined length to form a bottom edge thereof.

2. The method of claim 1, further including the step of:

providing an inner edge of said first and second metal forms with clamping members assuring that said sheet metal blank stays stationary when a press function is in operation.

3. The method of claim 1, further including the step of:

sizing and shaping said indents and detents to follow a digital length of indexing of said sheet metal blank as it passes over said first metal form.

4. The method of claim 1, further including the step of:

forming said sheet metal blank into a curved shape before feeding said sheet metal blank over said first metal form.

5. The method of claim 1, further including the step of:

forming said sheet metal blank into a curved shape after bending said sheet metal blank over said second metal form.

6. The method of claim 1, wherein:

said steps for calculating the amount of stretch needed per unit length for forming a curved outer edge on said sheet metal blank include:

a. calculating a length of a swept line s created by said outer edge thereof when said turbine blade is to rotate around a center line of rotation;

b. measuring a vertical distance v of the curved shaped turbine blade from a bottom edge thereof;

c. calculating the length l of a hypotenuse applying the equation:

$$l=\sqrt{s^2+v^2};$$

d. calculating an amount of stretch x needed to form an outer edge of a curve by subtracting v from l $$x=l-v.$$

* * * * *